(12) United States Patent
Li et al.

(10) Patent No.: US 12,394,284 B2
(45) Date of Patent: Aug. 19, 2025

(54) AUTO RING NOTIFICATION TO NESTED SMOKE AUDIO RECEIVER

(71) Applicant: RESIDEO LLC, Golden Valley, MN (US)

(72) Inventors: Liangju Li, Shanghai (CN); Zida Wang, Shanghai (CN); Kun Yang, Shanghai (CN)

(73) Assignee: Resideo LLC, Golden Valley, MN (US)

( * ) Notice: Subject to any disclaimer, the term of this patent is extended or adjusted under 35 U.S.C. 154(b) by 163 days.

(21) Appl. No.: 18/261,869

(22) PCT Filed: Jan. 20, 2021

(86) PCT No.: PCT/CN2021/072843
§ 371 (c)(1),
(2) Date: Jul. 18, 2023

(87) PCT Pub. No.: WO2022/155808
PCT Pub. Date: Jul. 28, 2022

(65) Prior Publication Data
US 2024/0078879 A1    Mar. 7, 2024

(51) Int. Cl.
*G08B 3/10* (2006.01)
*G08B 17/10* (2006.01)
*H04M 11/02* (2006.01)

(52) U.S. Cl.
CPC ............. *G08B 3/10* (2013.01); *G08B 17/10* (2013.01); *H04M 11/025* (2013.01)

(58) Field of Classification Search
CPC ......... G08B 3/10; G08B 17/10; H04M 11/025
(Continued)

(56) References Cited

U.S. PATENT DOCUMENTS 9,520,042 B2   12/2016   Eck
10,540,864 B2   1/2020   Sloo et al.
(Continued)

OTHER PUBLICATIONS

International Search Report and Written Opinion for International Application No. PCT/ CN2021/072843, mailed Jun. 16, 2021, English Translation, 10 pgs.

*Primary Examiner* — Kerri L McNally
(74) *Attorney, Agent, or Firm* — Greenberg Traurig, LLP; David J. Dykeman; Nicholas Martin

(57) ABSTRACT

A system includes a doorbell at an exterior of a premises comprising a doorbell housing, a button, a doorbell wireless transceiver, and a doorbell speaker and doorbell microphone coupled to the doorbell wireless transceiver. The system also includes a smoke detector at an interior of the premises comprising a smoke detector housing, a smoke detector wireless transceiver, and a smoke detector speaker and smoke detector microphone coupled to the smoke detector wireless transceiver. The smoke detector wireless transceiver is configured to be in two-way audio communication with the doorbell wireless transceiver. The two-way audio communication includes transmitting audio from the doorbell microphone to the smoke detector speaker via the wireless transceivers. The two-way audio communication also includes transmitting audio from the smoke detector microphone to the doorbell speaker via the wireless transceivers. In some systems, a second smoke detector is included and in some systems, a control panel is included.

16 Claims, 5 Drawing Sheets

(58) Field of Classification Search
USPC .......................................................... 340/628
See application file for complete search history.

(56) References Cited

U.S. PATENT DOCUMENTS

| | | |
|---|---|---|
| 2003/0179096 A1 | 9/2003 | Hanan |
| 2004/0229569 A1* | 11/2004 | Franz ..................... H04M 3/16 |
| | | 455/66.1 |
| 2011/0074590 A1* | 3/2011 | Sacknoff ................ G08B 17/10 |
| | | 340/10.5 |
| 2015/0035987 A1* | 2/2015 | Fernandez ............. H04N 7/186 |
| | | 348/156 |
| 2015/0077240 A1* | 3/2015 | Eck ........................ G08B 17/10 |
| | | 340/501 |
| 2019/0114891 A1 | 4/2019 | Eck |

\* cited by examiner

AUTO RING NOTIFICATION TO NESTED SMOKE AUDIO RECEIVER

RELATED APPLICATIONS

This application is a 35 U.S.C. 371 national stage filing from International Application No. PCT/CN2021/072843, filed Jan. 20, 2021, the entire contents of which is incorporated herein by reference.

TECHNICAL FIELD

This disclosure relates generally to doorbell notification systems and methods relating to such doorbell notification systems.

BACKGROUND

Doorbell systems can provide notifications to one or more occupants of a residence that a person is at a door via auditory signals. Once notified, the one or more occupants physically go to the door to communicate with the person(s) that activated the doorbell. Some current doorbell systems can provide notifications to one or more occupants of a residence via visual signals in addition to auditory signals. Further, some current doorbell systems can interface with a cellphone via the internet and communicate with the cellphone user. However, such communication is limited between the doorbell and the cellphone user.

SUMMARY

This disclosure in general describes doorbell notification system embodiments as well as related systems and methods. In particular, embodiments disclosed herein can, for instance, facilitate enhanced communication between occupants of a residence and persons at a door activating a doorbell using one or more smoke alarms. The one or more smoke alarms may comprise, for example, a microphone and speaker for communication with the persons at the door.

One embodiment includes a system comprising a doorbell at an exterior of a premises which can include a doorbell housing and a button at the doorbell housing with the button configured to be actuated by a visitor to the premises. The doorbell can further include a doorbell wireless transceiver at the doorbell housing. Further, the doorbell can include a doorbell speaker at the doorbell housing and coupled to the doorbell wireless transceiver as well as a doorbell microphone at the doorbell housing and coupled to the doorbell wireless transceiver. The system can also include a smoke detector at an interior of the premises with the smoke detector comprising a smoke detector housing and a smoke detector wireless transceiver at the smoke detector housing. The smoke detector can further include a smoke detector speaker at the smoke detector housing and coupled to the smoke detector wireless transceiver as well as a smoke detector microphone at the smoke detector housing and coupled to the smoke detector wireless transceiver. In the embodiment, the smoke detector wireless transceiver can be configured to be in two-way audio communication with the doorbell wireless transceiver such that the doorbell wireless transceiver transmits audio from the doorbell microphone to the smoke detector wireless transceiver and receives audio from the smoke detector microphone via the smoke detector wireless transceiver. Further, in the embodiment, the smoke detector wireless transceiver is configured to be in two-way audio communication with the doorbell wireless transceiver such that the smoke detector wireless transceiver transmits audio from the smoke detector microphone to the doorbell wireless transceiver and receives audio from the doorbell microphone via the doorbell wireless transceiver.

In a further embodiment of the system, the two-way audio communication between the smoke detector wireless transceiver and the doorbell wireless transceiver is established as a result of the visitor actuating the button.

In a further embodiment of the system, upon the visitor actuating the button, the doorbell wireless transceiver transmits a link request signal to the smoke detector wireless transceiver.

In a further embodiment of the system, upon the smoke detector wireless transceiver receiving the link request signal, the smoke detector wireless transceiver transmits a link confirmation signal to the doorbell wireless transceiver.

In a further embodiment of the system, the two-way audio communication between the smoke detector wireless transceiver and the doorbell wireless transceiver is established as a result of the doorbell wireless transceiver receiving the link confirmation signal.

In a further embodiment of the system, the system also comprises a second smoke detector at the interior of the premises with the second smoke detector comprising a second smoke detector housing and a second smoke detector wireless transceiver at the second smoke detector housing. Further, the second smoke detector can include a second smoke detector speaker at the second smoke detector housing and coupled to the second smoke detector wireless transceiver as well as a second smoke detector microphone at the second smoke detector housing and coupled to the second smoke detector wireless transceiver. In the embodiment, the second smoke detector wireless transceiver can be configured to be in two-way audio communication with the doorbell wireless transceiver such that the doorbell wireless transceiver transmits audio from the doorbell microphone to the second smoke detector wireless transceiver and receives audio from the second smoke detector microphone via the second smoke detector wireless transceiver. Further, in the embodiment, the second smoke detector wireless transceiver can be configured to be in two-way audio communication with the doorbell wireless transceiver such that the second smoke detector wireless transceiver transmits audio from the second smoke detector microphone to the doorbell wireless transceiver and receives audio from the doorbell microphone via the doorbell wireless transceiver.

In a further embodiment of the system, the first smoke detector is configured to be in the two-way audio communication with the doorbell wireless transceiver independent of the second smoke detector being in the two-way audio communication with the doorbell wireless transceiver.

In a further embodiment of the system, the two-way audio communication between the first smoke detector wireless transceiver and the doorbell wireless transceiver is established as a result of the first smoke detector microphone receiving a first voice command. Additionally, in the embodiment, the two-way audio communication between the second smoke detector wireless transceiver and the doorbell wireless transceiver is established as a result of the second smoke detector microphone receiving a second voice command.

In a further embodiment of the system, the system further comprises a control panel at the interior of the premises. The control panel can comprise a control panel wireless transceiver configured to be in communication with at least one of the first smoke detector wireless transceiver, the second smoke detector wireless transceiver, and the doorbell wireless transceiver. The control panel can further include a processor configured to receive input and, in response to the input, cause the control panel to prevent at least one of audio output and audio input. The prevented audio output being at at least one of the first smoke detector speaker and the second smoke detector speaker. The prevented audio input being at at least one of the first smoke detector microphone and the second smoke detector microphone.

In a further embodiment of the system, the control panel further comprises a user interface. In the embodiment, the input received by the processor is a reject link command input received at the user interface.

In a further embodiment of the system the input received by the processor is a reject link command input received according to a preset time-based instruction.

In a further embodiment of the system, the smoke detector further comprises at least one of a passive infrared (PIR) sensor and an imaging device configured to detect movement of an occupant. In the embodiment, the smoke detector wireless transceiver can be configured to be in two-way audio communication with the doorbell wireless transceiver when at least one of the PIR sensor and the imaging device detect movement of the occupant.

Another embodiment includes a method. This method embodiment includes the step of establishing a two-way audio communication session between a doorbell at an exterior of a premises and a smoke detector at an interior of the premises. The doorbell of the embodiment can include a doorbell housing and a button at the doorbell housing with the button configured to be actuated by a visitor to the premises. The doorbell can further include a doorbell wireless transceiver at the doorbell housing. Further, the doorbell can include a doorbell speaker at the doorbell housing and coupled to the doorbell wireless transceiver as well as a doorbell microphone at the doorbell housing and coupled to the doorbell wireless transceiver. The smoke detector can be at an interior of the premises with the smoke detector comprising a smoke detector housing and a smoke detector wireless transceiver at the smoke detector housing. The smoke detector can further include a smoke detector speaker at the smoke detector housing and coupled to the smoke detector wireless transceiver as well as a smoke detector microphone at the smoke detector housing and coupled to the smoke detector wireless transceiver. The method embodiment further includes receiving first audio at the doorbell microphone and transmitting, via the doorbell wireless transceiver, the first audio to the smoke detector wireless transceiver. The method also includes outputting, via the smoke detector speaker, the first audio. Further, the method includes receiving second audio at the smoke detector microphone and transmitting, via the smoke detector wireless transceiver, the second audio to the doorbell wireless transceiver. The method additionally includes outputting, via the doorbell speaker, the second audio.

In a further embodiment of this method, the method includes establishing the two-way audio communication session is initiated upon the visitor actuating the button.

In a further embodiment of this method, upon the visitor actuating the button, the doorbell wireless transceiver transmits a link request signal to the smoke detector wireless transceiver.

In a further embodiment of this method, upon the smoke detector wireless transceiver receiving the link request signal, the smoke detector wireless transceiver transmits a link confirmation signal to the doorbell wireless transceiver.

In a further embodiment of this method, the two-way audio communication session between the smoke detector wireless transceiver and the doorbell wireless transceiver is established as a result of the doorbell wireless transceiver receiving the link confirmation signal.

In a further embodiment of this method, the method includes establishing a second two-way audio communication session between the doorbell and a second smoke detector at the interior of the premises. In the embodiment, the second smoke detector can comprise a second smoke detector housing and a second smoke detector wireless transceiver at the second smoke detector housing. Further, the second smoke detector can include a second smoke detector speaker at the second smoke detector housing and coupled to the second smoke detector wireless transceiver as well as a second smoke detector microphone at the second smoke detector housing and coupled to the second smoke detector wireless transceiver. The embodiment of the method also includes transmitting, via the doorbell wireless transceiver, the first audio to the second smoke detector wireless transceiver. The method further includes outputting, via the second smoke detector speaker, the first audio. Additionally, the method includes receiving third audio at the second smoke detector microphone and transmitting, via the second smoke detector wireless transceiver, the third audio to the doorbell wireless transceiver. The embodiment of the method also includes outputting, via the doorbell speaker, the third audio.

In a further embodiment of this method, wherein the two-way audio communication session between the first smoke detector wireless transceiver and the doorbell wireless transceiver is established as a result of the first smoke detector microphone receiving a first voice command. Further, in the embodiment, the second two-way audio communication session between the second smoke detector wireless transceiver and the doorbell wireless transceiver is established as a result of the second smoke detector microphone receiving a second voice command.

In a further embodiment of this method, the method includes receiving input at a control panel at the interior of the premises. In the embodiment, the control panel can comprise a control panel wireless transceiver configured to be in communication with at least one of the first smoke detector wireless transceiver, the second smoke detector wireless transceiver, and the doorbell wireless transceiver. The method also includes, in response to the input at the control panel, preventing at least one of the first audio output, the second audio reception, and the third audio reception. In the embodiment, the first audio output can be at at least one of the first smoke detector speaker and the second smoke detector speaker. Further, in the embodiment, the second audio reception can be at the first smoke detector microphone and the third audio reception can be at the second smoke detector microphone.

The details of one or more examples are set forth in the accompanying drawings and the description below. Other features, objects, and advantages will be apparent from the description and drawings, and from the claims.

BRIEF DESCRIPTION OF DRAWINGS

The following drawings are illustrative of particular examples of the present invention and therefore do not limit the scope of the invention. The drawings are not necessarily to scale, though embodiments can include the scale illustrated, and are intended for use in conjunction with the explanations in the following detailed description wherein like reference characters denote like elements. Examples of the present invention will hereinafter be described in conjunction with the appended drawings.

DETAILED DESCRIPTION

The following detailed description is exemplary in nature and is not intended to limit the scope, applicability, or configuration of the invention in any way. Rather, the following description provides some practical illustrations for implementing examples of the present invention. Those skilled in the art will recognize that many of the noted examples have a variety of suitable alternatives.

Figure 1:
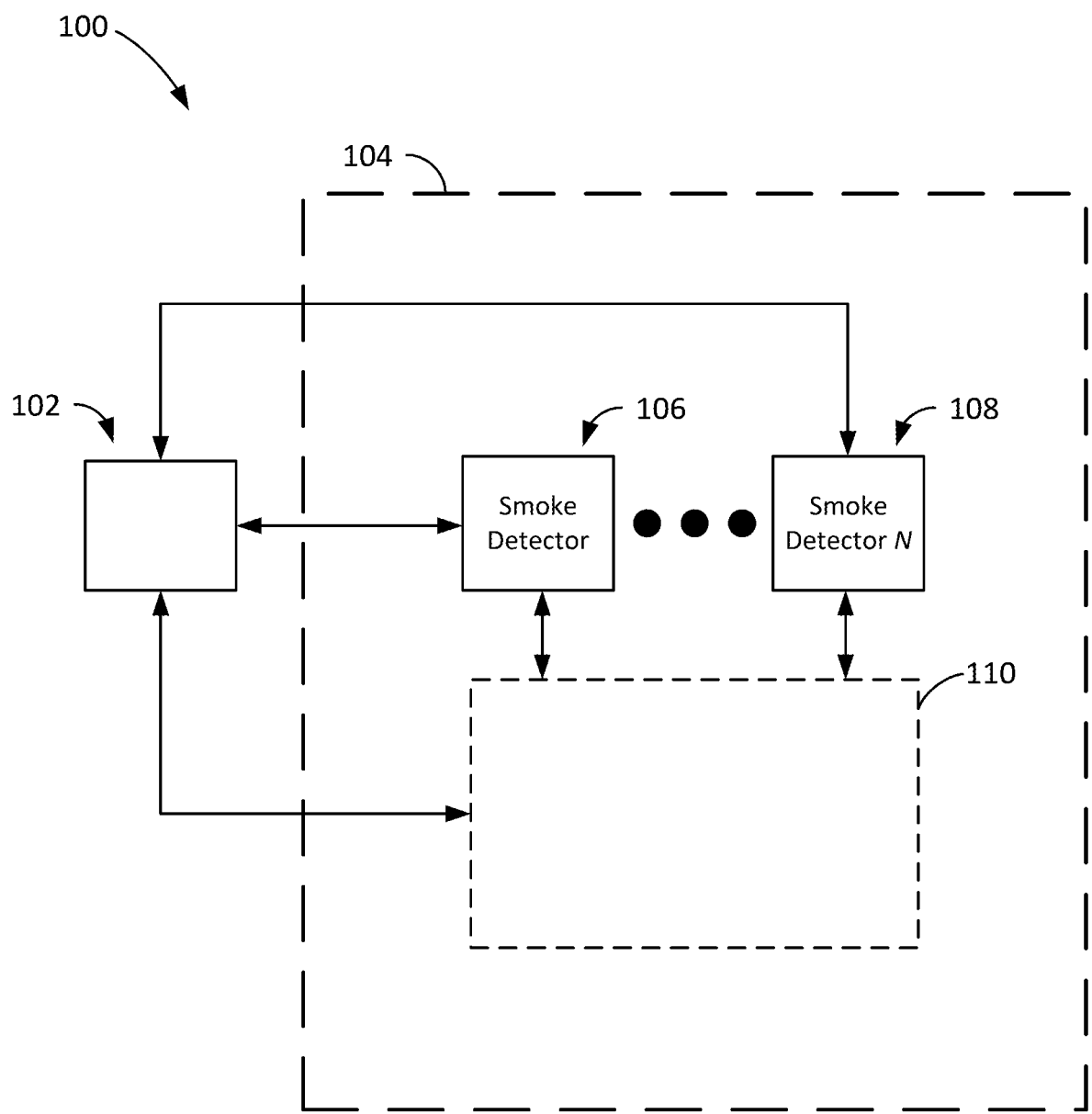
FIG. 1 is a block diagram of an example system including a doorbell notification system according to an aspect of the present disclosure.

FIG. 1 is a block diagram of an example system including a doorbell notification system 100 according to an aspect of the present disclosure. The doorbell notification system 100 includes a doorbell 102 located at an exterior of a premises 104, one or more smoke detectors 106, 108 located at an interior of the premises 104, and an optional control panel 110 which is also located at an interior of the premises 104. The doorbell 102 can be in electrical communication with the one or more smoke detectors 106, 108 and can further be in electrical communication with the control panel 110. The one or more smoke detectors 106, 108 can also be in electrical communication with the control panel 110. In some embodiments, the doorbell is in indirect communication with the one or more smoke detectors 106, 108 through the control panel 110. In some such embodiments, the control panel can communicate between the doorbell and the one or more smoke detectors. Further, in some embodiments, the one or more smoke detectors can be in electrical communication with each other. In FIG. 1, the electrical communications between the various components can be bi-directional, whereby information can be transmitted and received through the electrical communications. Further, in FIG. 1, while shown as lines, the electrical communications between the various components can be wireless electrical communications and/or wired electrical communications.

The embodiment of FIG. 1 includes a first smoke detector 106 and can further include an N number of additional smoke detectors 108 as shown. For example, in some embodiments, the doorbell notification system 100 includes only one smoke detector, however, in some embodiments, the doorbell notification system 100 includes two or more smoke detectors. Additionally, while only one doorbell 102 is shown, the doorbell notification system 100 can include more than one doorbell.

Figure 2:
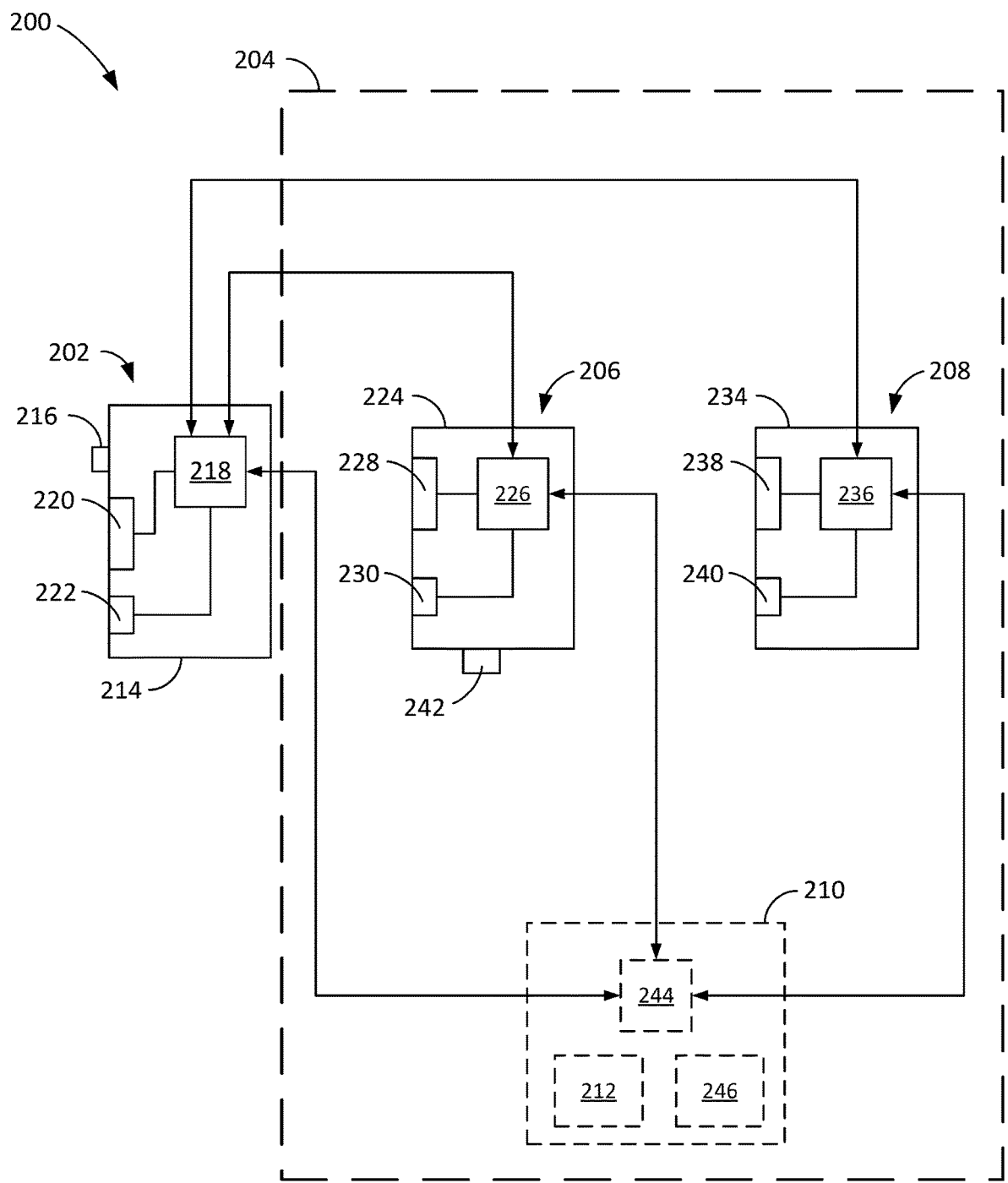
FIG. 2 is a block diagram of an example system including a doorbell notification system according to an aspect of the present disclosure.

In some example operations of the embodiment of FIG. 1, the doorbell 102 communicates wirelessly with the one or more smoke detectors 106, 108. In such example operations, a visitor can activate the doorbell 102 and the doorbell 102 can send notifications to the one or more smoke detectors 106, 108 that a visitor has activated the doorbell 102. Further, the doorbell 102 can record audio using a doorbell microphone and transmit the audio to the one or more smoke detectors 106, 108. The one or more smoke detectors 106, 108 can receive the audio and play the audio via a smoke detector speaker. The one or more smoke detectors 106, 108 can further record audio using a smoke detector microphone and transmit the audio to the doorbell 102. The doorbell 102 can receive the audio and play the audio via a doorbell speaker. Thus, in such example operations, the doorbell 102 and the one or more smoke detectors 106, 108 can be in two-way audio communication, transmitting and receiving audio signals to and from each other. For example, a visitor can active the doorbell and communicate, bi-directionally, with an occupant of the premises via the doorbell and the one or more smoke detectors Moving to FIG. 2, FIG. 2 is a block diagram of an example system including a doorbell notification system 200 according to an aspect of the present disclosure. The doorbell notification system 200 includes a doorbell 202 located at an exterior of a premises 204, smoke detectors 206, 208 located at an interior of the premises 204, and an optional control panel 210 also located at an interior of the premises 204. The premises can be any space, but in some examples, the premises is a house or apartment.

The doorbell 202 includes a doorbell housing 214 which can enclose various components of the doorbell 202. The doorbell housing 214 can take any size and shape and can be made of any material. The doorbell 202 also includes a button 216 located at the doorbell housing 214 with the button 216 configured to be actuated by a visitor to the premises 204. For example, in some embodiments, the button can be a push button which when depressed by a visitor, sends a signal to wires and/or circuitry in the doorbell 202.

The doorbell 202 can further include a doorbell wireless transceiver 218 and a doorbell speaker 220 which is coupled to the doorbell wireless transceiver 218. The doorbell wireless transceiver 218 and the doorbell speaker 220 can be located at the doorbell housing 214. The coupling between the doorbell wireless transceiver 218 and the doorbell speaker 220 can include an electrical communication in which signals and/or data is sent and received by the doorbell wireless transceiver 218 and the doorbell speaker 220. Further, the doorbell 202 can include a doorbell microphone 222 located at the doorbell housing 214 and coupled to the doorbell wireless transceiver 218. The coupling between the doorbell wireless transceiver 218 and the doorbell microphone 222 can also include an electrical communication in which signals and/or data is sent and received by the doorbell wireless transceiver 218 and the doorbell microphone 222.

In operation of the embodiment of FIG. 2, the doorbell speaker 220 can receive input signals, which can represent audio, from the doorbell wireless transceiver 218 and can generate sounds representative of the received audio. For example, the doorbell speaker 220 can receive input signals which represent a human voice from the doorbell wireless transceiver 218 and can generate sounds which represent the human voice. In further operation, the doorbell microphone 222 can receive audio and can generate input signals, which can represent the audio. For example, the doorbell microphone 222 can receive audio, such as audio of a human voice, and can generate input signals which represent the audio.

Continuing with the embodiment of FIG. 2, the smoke detector 206 is located at an interior of the premises 204. In some embodiments, the smoke detector 206 can be considered a first smoke detector. The smoke detector 206 includes a smoke detector housing 224 which can enclose various components of the smoke detector 206. The smoke detector housing 224 can take any size and shape and can be made of any material. The smoke detector 206 can further include a smoke detector wireless transceiver 226 and a smoke detector speaker 228 which is coupled to the smoke detector wireless transceiver 226. The smoke detector wireless transceiver 226 and the smoke detector speaker 228 can be located at the smoke detector housing 224. The coupling between the smoke detector wireless transceiver 226 and the smoke detector speaker 228 can include an electrical communication in which signals and/or data is sent and received by the smoke detector wireless transceiver 226 and the smoke detector speaker 228. Further, the smoke detector 206 can include a smoke detector microphone 230 located at the smoke detector housing 224 and coupled to the smoke detector wireless transceiver 226. The coupling between the smoke detector wireless transceiver 226 and the smoke detector microphone 230 can also include an electrical communication in which signals and/or data is sent and received by the smoke detector wireless transceiver 226 and the smoke detector microphone 230.

In operation, the smoke detector speaker 228 can receive input signals, which can represent audio, from the smoke detector wireless transceiver 226 and can generate sounds representative of the received audio. For example, the smoke detector speaker 228 can receive input signals which represent a human voice from the smoke detector wireless transceiver 226 and can generate sounds which represent the human voice. In further operation, the smoke detector microphone 230 can receive audio and can generate input signals, which can represent the audio. For example, the smoke detector microphone 230 can receive audio, such as audio of a human voice, and can generate input signals which represent the audio.

Continuing in the embodiment of FIG. 2, as illustrated by the arrows, the doorbell wireless transceiver 218 can be in electrical communication with the smoke detector wireless transceiver 226. In some embodiments, the electrical communication between the doorbell wireless transceiver 218 and the smoke detector wireless transceiver 226 is wireless communication. Further, in some embodiments, the smoke detector wireless transceiver 226 is configured to be in two-way audio communication with the doorbell wireless transceiver 218. In such embodiments, the doorbell wireless transceiver 218 transmits audio from the doorbell microphone 222 to the smoke detector wireless transceiver 226 and receives audio from the smoke detector microphone 230 via the smoke detector wireless transceiver 226. Additionally, in some such embodiments, the smoke detector wireless transceiver 226 transmits audio from the smoke detector microphone 230 to the doorbell wireless transceiver 218 and receives audio from the doorbell microphone 222 via the doorbell wireless transceiver 218.

For example, in some embodiments, the doorbell microphone 222 can receive audio, such as audio of a human voice, and can generate input signals which represent the audio. The doorbell wireless transceiver 218 can receive the input signals representative of the audio and can wirelessly transmit the input signals to the smoke detector wireless transceiver 226. The smoke detector wireless transceiver 226 can receive the input signals from the doorbell wireless transceiver 218 and can further transmit the input signals to the smoke detector speaker 228. The smoke detector speaker 228 can receive the input signals from the smoke detector wireless transceiver 226 and can generate sounds which are ultimately representative of the audio of the human voice received by the doorbell microphone 222.

Further, in some such embodiments, the smoke detector microphone 230 can receive audio, such as audio of a human voice, and can generate input signals which represent the audio. The smoke detector wireless transceiver 226 can receive the input signals representative of the audio and can wirelessly transmit the input signals to the doorbell wireless transceiver 218. The doorbell wireless transceiver 218 can receive the input signals from the smoke detector wireless transceiver 226 and can further transmit the input signals to the doorbell speaker 220. The doorbell speaker 220 can receive the input signals from the doorbell wireless transceiver 218 and can generate sounds which are ultimately representative of the audio of the human voice received by the smoke detector microphone 230.

Thus, in such embodiments, a visitor located at an exterior of the premises 204 can wirelessly communicate with an occupant located at an interior of the premises 204 using the smoke detector wireless transceiver 226 configured to be in two-way audio communication with the doorbell wireless transceiver 218.

The wireless two-way audio communication between the smoke detector wireless transceiver 226 the doorbell wireless transceiver 218 can use any type of wireless protocol. For example, the two-way audio communication can use Bluetooth, ZigBee, and/or Wi-Fi. Further, in some embodiments, the wireless two-way audio communication between the smoke detector wireless transceiver 226 the doorbell wireless transceiver 218 can use and/or be a part of a mesh network. In some such embodiments, the doorbell wireless transceiver 218, the smoke detector wireless transceiver 226, and any other smoke detector wireless transceiver 226 can be a node which connects to any other node. For example, in embodiments with multiple smoke detectors and multiple smoke detector wireless transceivers, one smoke detector with one smoke detector transceiver can relay communications from the other smoke detectors to the doorbell wireless transceiver.

In some embodiments, the wireless two-way audio communication between the smoke detector wireless transceiver 226 and the doorbell wireless transceiver 218 is inactive and/or in a low-power state until it is activated. For example, the smoke detector wireless transceiver 226 and the doorbell wireless transceiver 218 may be in a standby state, consuming less power than they would be in an active state, and waiting for a signal to establish a connection between therebetween. In some embodiments, in the standby state, the microphone and/or the speaker of the doorbell 202 and/or the one or more smoke detectors 206, 208 are inactive. For example, in such a standby state, the doorbell microphone 222 may not generate input signals representative of audio and the smoke detector speaker 228 may not generate sounds representative of the audio due to the two-way audio communication being inactive.

However, the wireless two-way audio communication between the smoke detector wireless transceiver 226 and the doorbell wireless transceiver 218 can be activated (e.g., from the low-power state) in a variety of ways. In some embodiments, the wireless two-way audio communication is established by voice command. A voice command can include any audio, and in some examples, the voice command is human speech. For example, in some embodiments, if an occupant speaks at all, the wireless two-way audio communication is established. Additionally or alternatively, in some embodiments, the voice command is a specific word or phrase.

In some embodiments, the wireless two-way audio communication is established as a result of a visitor actuating the doorbell button 216. In some such embodiments, upon the visitor actuating the button 216, the doorbell wireless transceiver 218 transmits a link request signal to the smoke detector wireless transceiver 226. The link request signal can notify the smoke detector wireless transceiver 226 that the doorbell wireless transceiver 218 is ready and available to wirelessly communicate with the smoke detector wireless transceiver 226. In some embodiments, in order for the two-way audio communication to be fully established, the smoke detector wireless transceiver 226 sends a link confirmation signal to the doorbell wireless transceiver 218. For example, in some embodiments, upon the smoke detector wireless transceiver 226 receiving the link request signal, the smoke detector wireless transceiver 226 transmits a link confirmation signal to the doorbell wireless transceiver 218. The doorbell wireless transceiver 218 can receive the link confirmation signal which can indicate to the doorbell wireless transceiver 218 that the two-way audio communication is established. For example, in some embodiments, the two-way audio communication between the smoke detector wireless transceiver 226 and the doorbell wireless transceiver 218 is established as a result of the doorbell wireless transceiver 218 receiving the link confirmation signal. By using a link request signal and a link confirmation signal, the smoke detector wireless transceiver 226 and the doorbell wireless transceiver 218 can determine and confirm that they are ready and able to send and/or receive audio to and/or from each other.

Continuing with the embodiment of FIG. 2, the smoke detector 208 is located at an interior of the premises 204. In some embodiments, the smoke detector 206 is considered a first smoke detector 206 and the smoke detector 208 can be considered a second smoke detector 208. The second smoke detector 208 includes a second smoke detector housing 234 which can enclose various components of the second smoke detector 208. The second smoke detector housing 234 can take any size and shape and can be made of any material. The second smoke detector 208 can further include a second smoke detector wireless transceiver 236 and a second smoke detector speaker 238 which is coupled to the second smoke detector wireless transceiver 236. The second smoke detector wireless transceiver 236 and the second smoke detector speaker 238 can be located at the second smoke detector housing 234. The coupling between the second smoke detector wireless transceiver 236 and the second smoke detector speaker 238 can include an electrical communication in which signals and/or data is sent and received by the second smoke detector wireless transceiver 236 and the second smoke detector speaker 238. Further, the second smoke detector 208 can include a second smoke detector microphone 240 located at the second smoke detector housing 234 and coupled to the second smoke detector wireless transceiver 236. The coupling between the second smoke detector wireless transceiver 236 and the second smoke detector microphone 240 can also include an electrical communication in which signals and/or data is sent and received by the second smoke detector wireless transceiver 236 and the second smoke detector microphone 240.

Further, as illustrated by the arrows, the doorbell wireless transceiver 218 can be in electrical communication with the second smoke detector wireless transceiver 236. In some embodiments, the electrical communication between the doorbell wireless transceiver 218 and the second smoke detector wireless transceiver 236 is wireless communication. Further, in some embodiments, the second smoke detector wireless transceiver 236 is configured to be in two-way audio communication with the doorbell wireless transceiver 218. In such embodiments, the doorbell wireless transceiver 218 transmits audio from the doorbell microphone 222 to the second smoke detector wireless transceiver 236 and receives audio from the second smoke detector microphone 240 via the second smoke detector wireless transceiver 236. Additionally, in some such embodiments, the second smoke detector wireless transceiver 236 transmits audio from the second smoke detector microphone 240 to the doorbell wireless transceiver 218 and receives audio from the doorbell microphone 222 via the doorbell wireless transceiver 218.

For example, in some embodiments, the doorbell microphone 222 can receive audio, such as audio of a human voice, and can generate input signals which represent the audio. The doorbell wireless transceiver 218 can receive the input signals representative of the audio and can wirelessly transmit the input signals to the second smoke detector wireless transceiver 236. The second smoke detector wireless transceiver 236 can receive the input signals from the doorbell wireless transceiver 218 and can further transmit the input signals to the second smoke detector speaker 238. The second smoke detector speaker 238 can receive the input signals from the second smoke detector wireless transceiver 236 and can generate sounds which are ultimately representative of the audio of the human voice received by the doorbell microphone 222.

Additionally, in some such embodiments, the second smoke detector microphone 240 can receive audio, such as audio of a human voice, and can generate input signals which represent the audio. The second smoke detector wireless transceiver 236 can receive the input signals representative of the audio and can wirelessly transmit the input signals to the doorbell wireless transceiver 218. The doorbell wireless transceiver 218 can receive the input signals from the second smoke detector wireless transceiver 236 and can further transmit the input signals to the doorbell speaker 220. The doorbell speaker 220 can receive the input signals from the doorbell wireless transceiver 218 and can generate sounds which are ultimately representative of the audio of the human voice received by the second smoke detector microphone 240.

Thus, in such embodiments, a visitor located at an exterior of the premises 204 can wirelessly communicate with an occupant located at an interior of the premises 204 using the second smoke detector wireless transceiver 236 configured to be in two-way audio communication with the doorbell wireless transceiver 218.

In some embodiments which include two or more smoke detectors, the smoke detectors can be configured to be in two-way audio communication with the doorbell wireless transceiver independent of the other smoke detectors. For example, in the embodiment of FIG. 2, the first smoke detector 206 is configured to be in two-way audio communication with the doorbell wireless transceiver 218 independent of the second smoke detector 208 being in the two-way audio communication with the doorbell wireless transceiver 218. Independent communication between the doorbell and any smoke detectors can be advantageous as communication may not be necessary between all the smoke detectors and the doorbell simultaneously. For example, if a visitor activates the doorbell, an occupant can communicate with one smoke detector while any other smoke detectors are not active. The active smoke detector can allow the visitor and the occupant to communicate without activating the speakers, microphones, or other components of the other smoke detectors which can reduce power consumption. In such an example, the occupant and the visitor can communicate without possible interference from other occupants located where the other smoke detectors are located.

Further, in some embodiments which include two or more smoke detectors, each smoke detector can be activated to be in two-way audio communication with the doorbell independently of one another. For example, in some embodiments, a first smoke detector can be activated and establish a two-way audio communication between the first smoke detector and the doorbell. Independently of any connection with or activation of the first smoke detector, the second smoke detector can be activated and establish a two-way audio communication between the first smoke detector and the doorbell.

In some examples, to establish the two-way audio communication between the first smoke detector wireless transceiver 226 and the doorbell wireless transceiver 218, an occupant can use a first voice command. In some such examples, the first smoke detector microphone 230 can receive the first voice command and the first smoke detector wireless transceiver 226 can establish the two-way audio communication. Further, in some examples, to establish the two-way audio communication between the second smoke detector wireless transceiver 236 and the doorbell wireless transceiver, an occupant can use a second voice command. In some such examples, the second smoke detector microphone 240 can receive the second voice command and the second smoke detector wireless transceiver 236 can establish the two-way audio communication. The first voice command and the second voice command can be the same voice command or can be different voice commands.

In some embodiments, the smoke detector 206 includes a passive infrared (PIR) sensor and/or imaging device 242. The PIR sensor and/or imaging device 242 is located at the smoke detector housing 224 and can be configured to detect movement. For example, the PIR sensor and/or imaging device 242 can be configured to detect movement of an occupant located at the interior of the premises 204. In some embodiments, the PIR sensor and/or imaging device can detect movement of more than one occupant. Additionally or alternatively, the PIR sensor and/or imaging device 242 can have a variable sensitivity for detecting motion. Further, the PIR sensor and/or imaging device 242 can be in electrical communication with the smoke detector wireless transceiver 226 such that the smoke detector wireless transceiver 226 receives a signal when the PIR sensor and/or imaging device 242 detects movement.

The PIR sensor and/or imaging device 242 can further be configured to establish the two-way audio communication between the smoke detector wireless transceiver 226 and the doorbell wireless transceiver 218. In some such embodiments, when the PIR sensor and/or imaging device 242 detects movement of an occupant, the smoke detector wireless transceiver 226 is configured to be in two-way audio communication with the doorbell wireless transceiver 218. However, in some such configurations, the PIR sensor and/or imaging device 242 can deactivate the two-way audio communication when no motion is detected for a period of time.

In some embodiments, other smoke detectors also include a PIR sensor and/or imaging device 242. In such embodiments, the smoke detectors can each be selectively in two-way audio communication with the doorbell if their respective PIR sensor and/or imaging device detects movement of an occupant. For example, a system can include a first smoke detector in a first room and a second smoke detector in a second room. An occupant can be in the first room when the two-way audio communication is established with the first smoke detector wireless transceiver in communication with the doorbell wireless transceiver. The occupant can then move to the second room, wherein a second PIR sensor and/or imaging device of the second smoke detector detects the occupant's movement. Once the movement has been detected, the second smoke detector can be in two-way audio communication with the doorbell via their respective wireless transceivers. Such examples can be advantageous as an occupant, or occupants, can move between rooms while maintaining audio communication with a visitor located exterior to the premises. Further, in some embodiments, PIR sensor and/or imaging device 242 can prevent activation of the two-way audio communication such that only smoke detectors in rooms which detect movement can be active for communication. While a PIR sensor and/or imaging device 242 has been described, a person of ordinary skill will recognize that other sensors can be used to determine whether a smoke detector should be activated to establish the two-way audio communication with the doorbell.

Continuing with the embodiment of FIG. 2, the doorbell notification system 200 can optionally include a control panel 210 comprising a processor 212 and a control panel wireless transceiver 244. In such embodiments, the control panel 210 is located at the interior of the premises 204. As shown by the arrows in FIG. 2, the control panel wireless transceiver 244 can be configured to be in communication with at least one of the first smoke detector wireless transceiver 226, the second smoke detector wireless transceiver 236, and the doorbell wireless transceiver 218. The communication can be wireless communication. In some embodiments, the control panel wireless transceiver 244 is in communication with all of the first smoke detector wireless transceiver 226, the second smoke detector wireless transceiver 236, and the doorbell wireless transceiver 218.

The control panel 210 can also comprise a processor 212. The processor 212 can be any type of processor, and can include microprocessors, application specific integrated circuits (ASICs), and/or field programmable gate arrays (FPGAs). The processor 212 can further include computer readable memory, such as, for example, RANI, ROM, and read-write memory.

The control panel 210 can be configured to control various aspects of the doorbell notification system 200. For example, in some embodiments, the control panel 210 can be configured to prevent audio input and audio output from the smoke detectors 206, 208 and the doorbell 202. In some embodiments, the control panel 210 can deactivate the doorbell microphone, the smoke detectors' microphones, the doorbell speaker, and the smoke detectors' speakers to prevent the audio input and audio output. Additionally or alternatively, the control panel 210 can deactivate the link between the smoke detectors 206, 208 and the doorbell 202 to prevent the audio input and audio output.

In some embodiments, the processor 212 is configured to receive an input, and in response to the input, cause the control panel 210 to prevent audio output at at least one of the first smoke detector speaker 228 and the second smoke detector speaker 238. Additionally or alternatively, in response to the input, the processor 212 can be configured to cause the control panel 210 to prevent audio input at at least one of the first smoke detector microphone 230 and the second smoke detector microphone 240. For example, in some embodiments, the processor 212 can receive the input and cause the control panel 210 to deactivate the first smoke detector speaker 228 and first smoke detector microphone 230. In some further embodiments, the control panel can receive the input and prevent audio input and audio output from the components of the doorbell 202, the first smoke detector 206, and the second smoke detector 208. Prevention of audio input and/or audio output can be desirable as an occupant may desire the two-way communication link to be active only at specific times.

The control panel 210 can also comprise a user interface 246. The user interface 246 can be in communication with the other components of the control panel 210 including the processor 212 and the control panel wireless transceiver 244. In some embodiments, the user interface 246 includes a display which can display different functions that the control panel 210 can perform. In some embodiments, the user interface 246 is a touch screen display which can receive input from a user such as selecting an option which the control panel 210 can perform. For example, an input received by the processor 212 can be a reject link command input received at the user interface.

In operation, in some embodiments, the processor 212 can use the reject link command to cause the two-way audio communication link between the one or more smoke detector wireless transceivers 226, 236 and the doorbell wireless transceiver 218 to be deactivated. For example, an occupant may provide an input to the user interface (e.g., pushes a button) which communicates with the processor to send the reject link command to the various wireless transceivers (e.g., 218, 226, 236) which breaks the audio communication between the various wireless transceivers. Such operation can be advantageous as an occupant can deny audio communication with a visitor at their discretion by providing an input to the control panel 210 via the user interface 246.

Additionally or alternatively, in some embodiments, the control panel 210 can be configured to prevent audio input and/or audio output from the smoke detectors 206, 208 and the doorbell 202 during a specific time period. In some such embodiments, the processor 212 can receive an input, which is a reject link command, according to a present time-based instruction. For example, an occupant can use the user interface 246 to input an instruction to the processor 212 that the control panel 210 should be configured to prevent audio input and/or audio output of the smoke detectors 206, 208, and the doorbell 202 from 9:00 pm to 7:00 am. In some embodiments, the control panel 210 be configured to selectively prevent audio input and/or audio output to selected smoke detectors. For example, the control panel can prevent audio input and/or audio output to and/or from a second smoke detector while not preventing audio input and/or audio output to and/or from a first smoke detector. The control panel 210 can also be configured to stop preventing (e.g., allowing) audio input and/or output after set time has expired. Further, the control panel 210 can be configured to stop preventing audio input and/or audio output according to input received from an occupant using the user interface. The configuration of the control panel 210 can thus allow an occupant to prevent unwanted disruption from the speakers and/or microphones for any timeframe and for any smoke detectors. Further, such configuration of the control panel 210 can allow an occupant to activate/deactivate the system at their will.

Figure 3:
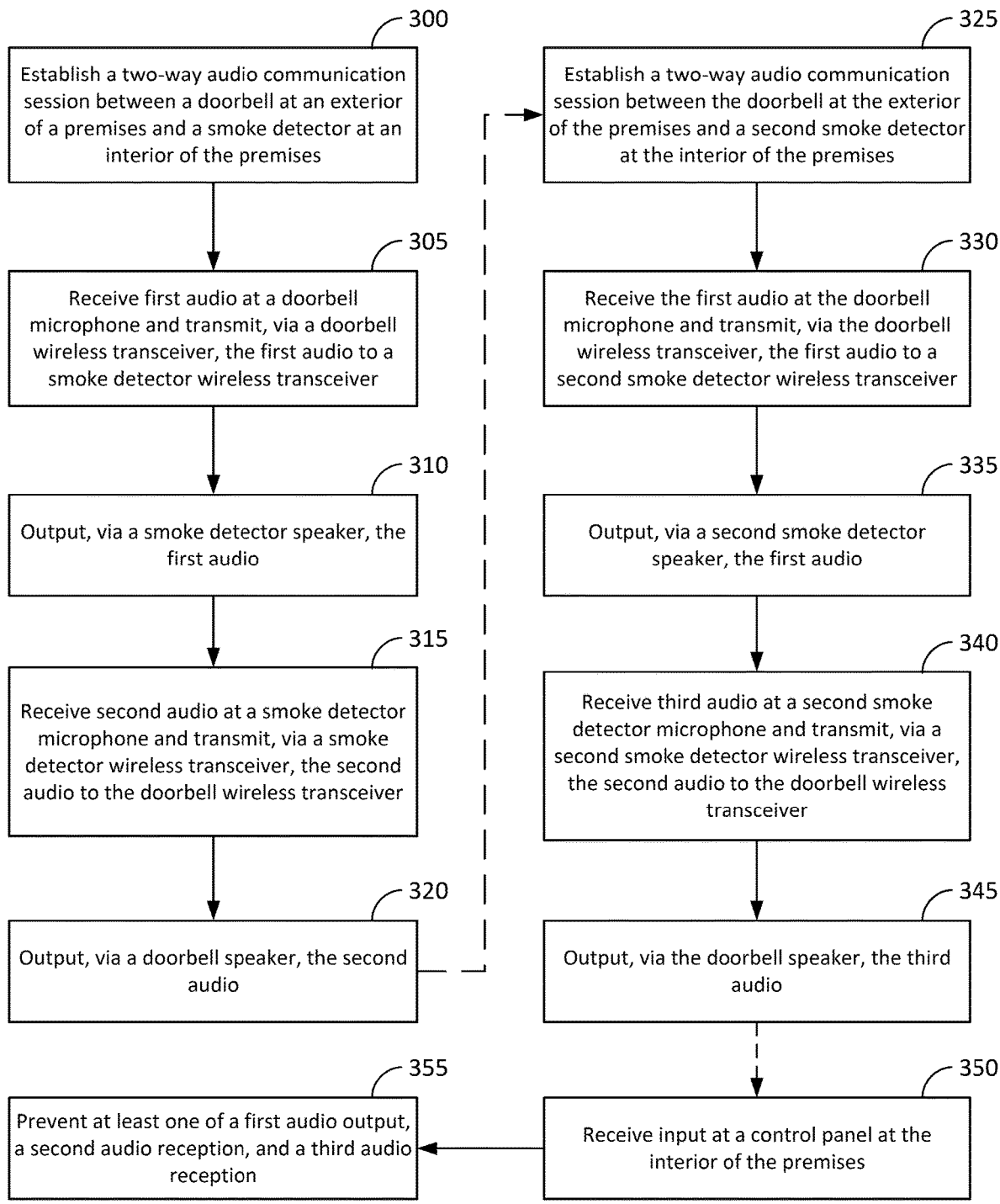
FIG. 3 is a flow diagram of an example method of using the doorbell notification system according to an aspect of the present disclosure.

Moving to FIG. 3, FIG. 3 is a flow diagram of an example method of using the doorbell notification system according to an aspect of the present disclosure. Starting at 300, the method includes establishing a two-way audio communication session between a doorbell and a smoke detector. In some such methods, the doorbell can comprise a doorbell housing, a button at the doorbell housing configured to be actuated by a visitor to the premises, and a doorbell wireless transceiver at the doorbell housing. Further, the doorbell can comprise a doorbell speaker at the doorbell housing and coupled to the doorbell wireless transceiver as well as a doorbell microphone at the doorbell housing and coupled to the doorbell wireless transceiver. Additionally, in some such methods, the smoke detector can comprise a smoke detector housing and a smoke detector wireless transceiver at the smoke detector housing. Further, the smoke detector can comprise a smoke detector speaker at the smoke detector housing coupled to the smoke detector wireless transceiver as well as a smoke detector microphone at the smoke detector housing and coupled to the smoke detector wireless transceiver. Moving to 305, the method includes receiving first audio at the doorbell microphone and transmitting, via the doorbell wireless transceiver, the first audio to the smoke detector wireless transceiver. Continuing with 310, the method includes outputting, via the smoke detector speaker, the first audio. At 315, the method includes receiving second audio at the smoke detector microphone and transmitting, via the smoke detector wireless transceiver, the second audio to the doorbell wireless transceiver. Further, at 320, the method includes outputting, via the doorbell speaker, the second audio.

As shown by the dotted connector, in some embodiments, the method can also include establishing a two-way audio communication session between the doorbell at the exterior of the premises and a second smoke detector at the interior of the premises as in 325. In some such methods, the second smoke detector can comprise a second smoke detector housing and a second smoke detector wireless transceiver at the second smoke detector housing. Further, the second smoke detector can comprise a second smoke detector speaker at the second smoke detector housing coupled to the second smoke detector wireless transceiver as well as a second smoke detector microphone at the second smoke detector housing and coupled to the smoke detector wireless transceiver. Moving to 330, the method can include receiving the first audio at the doorbell microphone and transmitting, via the doorbell wireless transceiver, the first audio to the second smoke detector wireless transceiver. Continuing with 335, the method can include outputting, via second smoke detector speaker, the first audio. At 340, the method can include receiving third audio at the second smoke detector microphone and transmitting, via the second smoke detector wireless transceiver, the third audio to the doorbell wireless transceiver. Further, at 345, the method can include outputting, via the doorbell speaker, the third audio.

In some embodiments of the method of FIG. 3, a visitor establishes the two-way audio communication session as in 300 by actuating the button of the doorbell. Additionally or alternatively, in some embodiments, the two-way audio communication session between the first smoke detector wireless transceiver and the doorbell wireless transceiver is established as a result of the first smoke detector microphone receiving a first voice command. Furthermore, in some embodiments, the two-way audio communication session between the second smoke detector wireless transceiver and the doorbell wireless transceiver is established as a result of the second smoke detector microphone receiving a second voice command.

As shown by the dotted connector, in some embodiments, the method of FIG. 3 can also include receiving input at a control panel at the interior of the premises as in 350. In such embodiments, the control panel can comprise a control panel wireless transceiver configured to be in communication with at least one of the first smoke detector wireless transceiver, the second smoke detector wireless transceiver, and the doorbell wireless transceiver. Continuing with 355, in response to the input at the control panel, the method can include preventing at least one of a first audio output, a second audio reception, and a third audio reception. For example, in some embodiments, the method can include preventing the first audio output at at least one of the first smoke detector speaker and the second smoke detector speaker. Additionally or alternatively, in some embodiments, the method can include preventing the second audio reception at the first smoke detector microphone. Additionally or alternatively, in some embodiments, the method can include preventing the third audio reception at the first second smoke detector microphone.

While only one doorbell has been described in the above embodiments, in some embodiments, more than one doorbell can be included in the doorbell notification system. Any subsequent doorbells can include similar components as those described above and can operate in a similar manner. However, in some embodiments, the subsequent doorbells can interface individually with one or more smoke detectors which can be the same or different smoke detectors than the smoke detectors described (e.g., 206, 208). For example, in some such embodiments, a visitor can actuate the button of a first doorbell and establish two-way audio communication with a first smoke detector while another visitor can actuate the button of the second doorbell and also establish a two-way audio communication with the first smoke detector. However, such two-way audio communication can be established at a different time than the first two-way audio communication. A person of ordinary skill will recognize other configurations of one or more doorbells establishing two-way audio communications with one or more smoke detectors are contemplated and that this disclosure is not limited to the above examples.

Figure 4A:
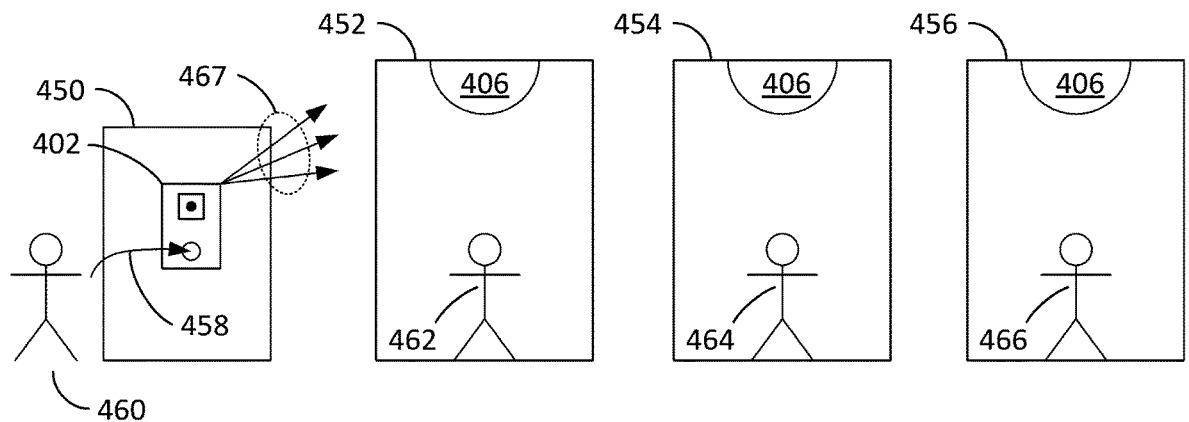
FIG. 4A is a schematic diagram of an example system including a doorbell notification system and an example method of using the doorbell notification system according to an aspect of the present invention.

Moving to FIG. 4A, FIG. 4A is a schematic diagram of an example system including a doorbell notification system and an example method of using the doorbell notification system according to an aspect of the present invention. The system includes a doorbell 402 located at an exterior of a premises near a door 450. As described elsewhere herein, the doorbell can include a doorbell housing, a button configured to be actuated by a visitor, a doorbell wireless transceiver, a doorbell speaker, and a doorbell microphone. The system also includes smoke detectors 406 located at an interior of the premises which can be in different rooms 452, 454, 456. As also described elsewhere herein, each of the smoke detectors 406 can include a smoke detector housing, a smoke detector wireless transceiver, a smoke detector speaker, and a smoke detector microphone.

Figure 4B:
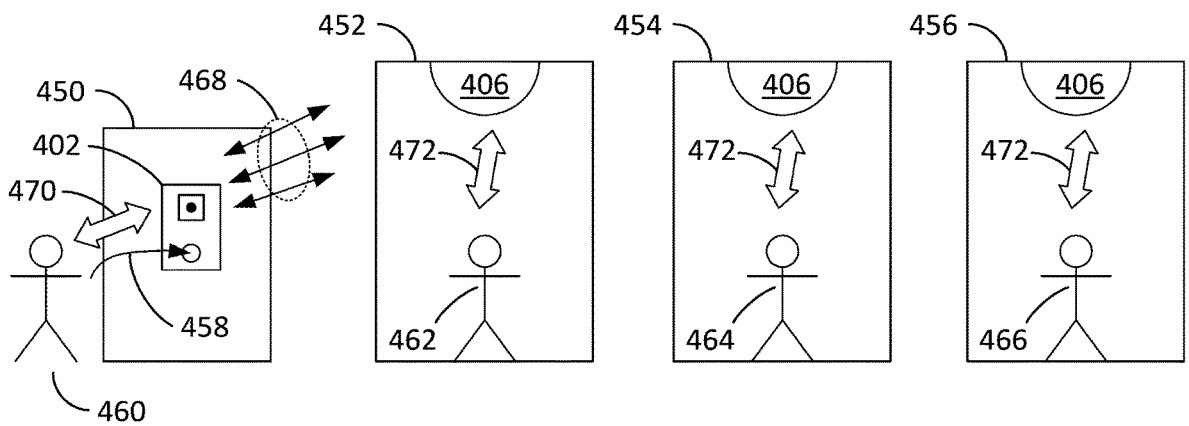
FIG. 4B is the schematic diagram of FIG. 4A including a continuation of the example method of using the doorbell notification system according to an aspect of the present invention.
Figure 4C:
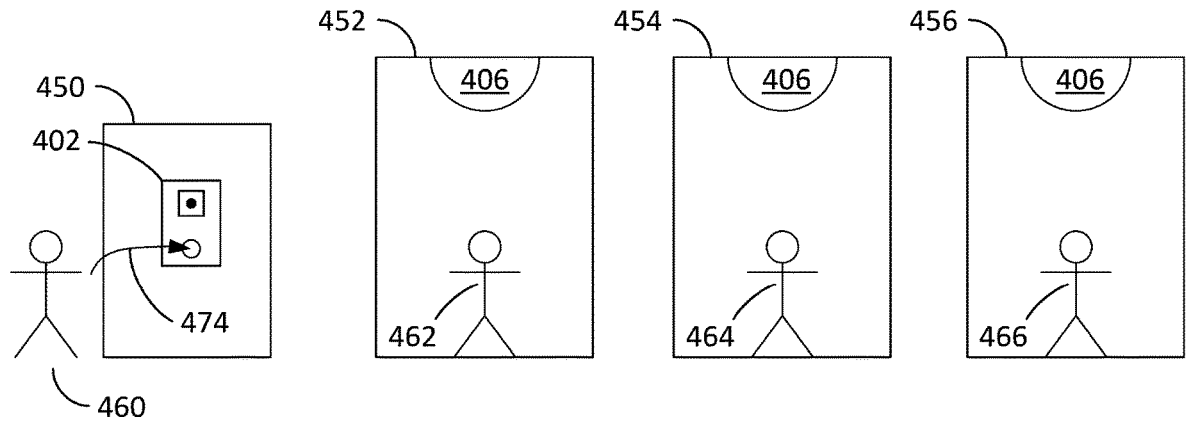
FIG. 4C is the schematic diagram of FIG. 4B including a continuation of the example method of using the doorbell notification system according to an aspect of the present invention.

In operation, as shown by arrow 458, a visitor 460 to the premises can actuate the button of the doorbell 402 in order to communicate with one or more occupants 462, 464, 466 of the premises. When actuated, the button of the doorbell 402 can cause the doorbell wireless transceiver to transmit a link request signal to each of the various smoke detector's 406 wireless transceivers as shown by arrows 467. Upon a smoke detector wireless transceiver receiving the link request signal, the smoke detector wireless transceiver can transmit a link confirmation signal to the doorbell wireless transceiver, thereby establishing two-way audio communication as shown by arrows 468. The two-way audio communication can be between each of the smoke detectors and the doorbell. For example, the smoke detector in room 452 can be in two-way communication with the doorbell 402 at the same time the smoke detector in room 454 is in two-way communication with the doorbell 402. In such an example, the visitor 460 can communicate with occupants 462 and 464 at substantially the same time. In the example of FIG. 4B, the visitor can send audio and receive audio from the doorbell 402 as shown by arrow 470. The occupants can send and receive audio from the smoke detectors 406 as shown by arrows 472. Thus, the visitor can send and receive audio to and from the occupants and vice versa. In some embodiments, the visitor holds the doorbell button down (e.g. shown by 458) to communicate with the one or more occupants 462, 464, 466 of the premises. While the doorbell button is depressed, the two-way audio communication between the doorbell 402 and the smoke detectors 406 can continue. However, in such embodiments, when the doorbell button is released, as shown by 474 in FIG. 4C, the two-way audio communication between the doorbell 402 and each of the smoke detectors 406 can be broken.

Figure 5A:
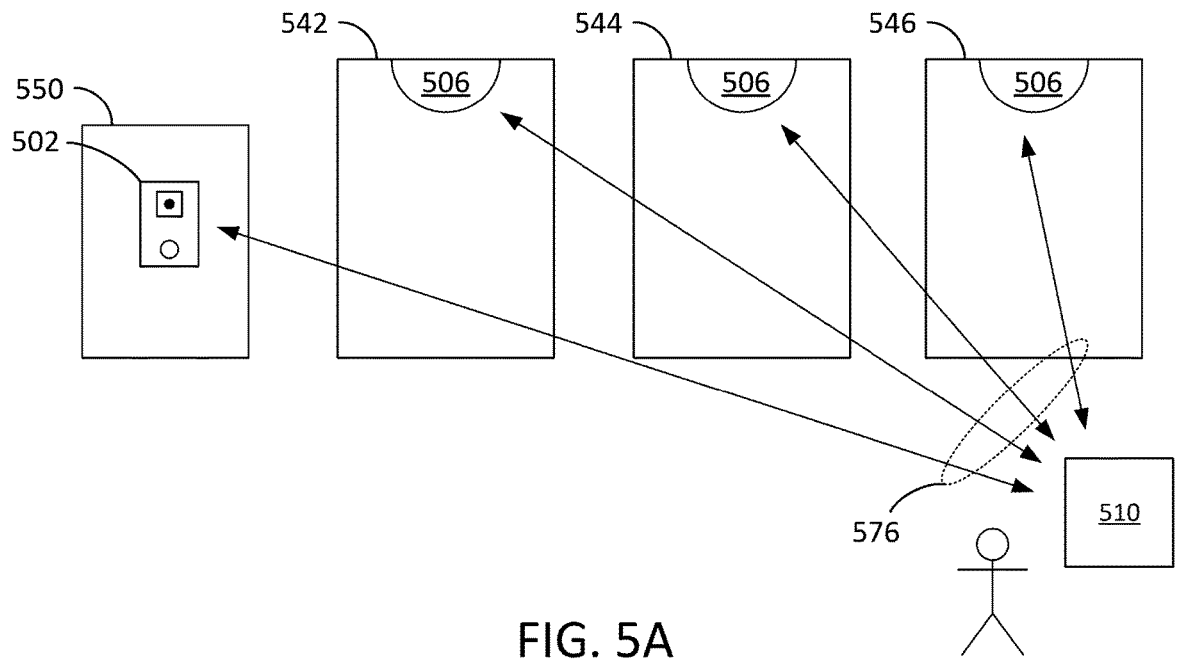
FIG. 5A is a schematic diagram of an example doorbell notification system including a control panel according to an aspect of the present invention.

Moving to FIG. 5A, FIG. 5A is a schematic diagram of an example doorbell notification system including a control panel 510 according to an aspect of the present invention. As discussed elsewhere herein, the control panel 510 can include a control panel wireless transceiver and can control various aspects of the system. The control panel 510 can be in wireless communication with the doorbell 502 and the smoke detectors 506 using the wireless transceiver as shown by the arrows 576. The control panel 510 can be programmed and/or receive input from a user to control the various aspects of the system. For example, in some embodiments, the control panel can, in response to input at the control panel, prevent audio input and/or audio output of the one or more smoke detectors 506. In one such embodiment, a silent period can be set for a specific timeframe (e.g. overnight) which can cause the control panel to prevent audio input and output from one or more of the smoke detectors 506. In some embodiments, the control panel 510 can be configured to set a silent period which prevents audio input and output from the doorbell 502. In some embodiments, the control panel 510 can be configured to adjust an alarm volume (e.g. doorbell ring volume) and/or audio volume (e.g. communication volume). In some embodiments the control panel 510 can be configured to set specific smoke detectors to only communicate with one or more specific doorbells. For example, a first doorbell may only communicate with a first smoke detector while a second doorbell may only communicate with a second and third smoked detector. Further, in some embodiments, the control panel can be configured such that when it receives an input, it hushes or otherwise prevents audio input and/or audio output of the one or more smoke detectors 506. Thus, in such embodiments, the occupant can ignore a visitor actuating the doorbell 502 via the control panel 510.

Figure 5B:
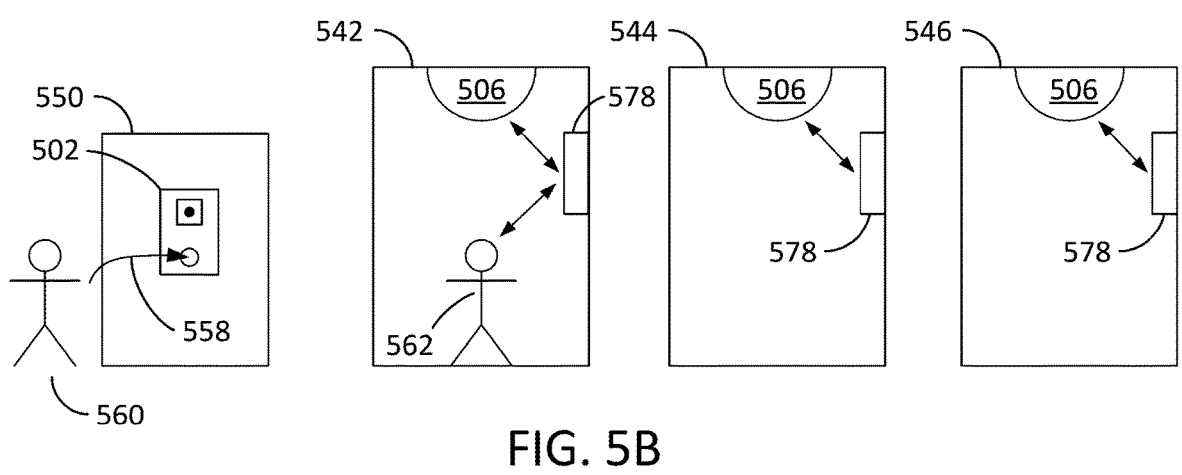
FIG. 5B is a schematic diagram of an example doorbell notification system including a PIR sensor according to an aspect of the present invention.

FIG. 5B is a schematic diagram of an example doorbell notification system including PIR sensors 578 according to an aspect of the present invention. The PIR sensors can detect movement (e.g. of an occupant 562) and can also be in communication (e.g. wireless communication) with the smoke detectors 506. Thus, when a visitor actuates the doorbell 502 button as shown by arrow 558, the PIR sensors can determine if an occupant 562 is present in the room and communicate with a smoke detector. If an occupant is not detected in the room, the PIR sensor can communicate with the corresponding smoke detector and prevent audio input and/or audio output to and/or from the smoke detector. For example, in FIG. 5B, visitor 560 can actuate the doorbell 502 button, sending a link request signal from the doorbell wireless transceiver to the smoke detectors wireless transceivers. Once received, the smoke detector wireless transceiver in room 542 can transmit a link confirmation signal to the doorbell wireless transceiver as the PIR sensor 578 has detected movement of the occupant 562, thereby establishing two-way communication. However, as the PIR sensors in rooms 544 and 546 have not detected movement of any occupants, the smoke detector wireless transceivers in rooms 544 and 546 may not transmit a link confirmation signal. In some embodiments, the smoke detector wireless transceivers in rooms 544 and 546 do transmit a link confirmation signal, but the corresponding smoke detector in the rooms disables audio input and/or audio output. In this way, only the smoke detectors which are in a room with movement, as detected by a PIR sensor, are active for two-way communication with the doorbell.

Various examples have been described. These and other examples are within the scope of the following claims.

What is claimed is:

1. A system comprising:
    a doorbell at an exterior of a premises, the doorbell comprising:
        a doorbell housing,
        a button at the doorbell housing, the button configured to be actuated by a visitor to the premises,
        a doorbell wireless transceiver at the doorbell housing,
        a doorbell speaker at the doorbell housing and coupled to the doorbell wireless transceiver, and
        a doorbell microphone at the doorbell housing and coupled to the doorbell wireless transceiver; and
    a smoke detector at an interior of the premises, the smoke detector comprising:
        a smoke detector housing,
        a smoke detector wireless transceiver at the smoke detector housing,
        a smoke detector speaker at the smoke detector housing and coupled to the smoke detector wireless transceiver, and
        a smoke detector microphone at the smoke detector housing and coupled to the smoke detector wireless transceiver,
    wherein the smoke detector wireless transceiver is configured to be in two-way audio communication with the doorbell wireless transceiver such that i) the doorbell wireless transceiver transmits audio from the doorbell microphone to the smoke detector wireless transceiver and receives audio from the smoke detector microphone via the smoke detector wireless transceiver, and ii) the smoke detector wireless transceiver transmits audio from the smoke detector microphone to the doorbell wireless transceiver and receives audio from the doorbell microphone via the doorbell wireless transceiver, wherein the two-way audio communication between the smoke detector wireless transceiver and the doorbell wireless transceiver is established as a result of the visitor actuating the button, wherein upon the visitor actuating the button, the doorbell wireless transceiver transmits a link request signal to the smoke detector wireless transceiver.

2. The system of claim 1, wherein upon the smoke detector wireless transceiver receiving the link request signal, the smoke detector wireless transceiver transmits a link confirmation signal to the doorbell wireless transceiver.

3. The system of claim 2, wherein the two-way audio communication between the smoke detector wireless transceiver and the doorbell wireless transceiver is established as a result of the doorbell wireless transceiver receiving the link confirmation signal.

4. The system of claim 1, wherein the smoke detector comprises a first smoke detector, and the system further comprises:
    a second smoke detector at the interior of the premises, the second smoke detector comprising:
        a second smoke detector housing,
        a second smoke detector wireless transceiver at the second smoke detector housing,
        a second smoke detector speaker at the second smoke detector housing and coupled to the second smoke detector wireless transceiver, and
        a second smoke detector microphone at the second smoke detector housing and coupled to the second smoke detector wireless transceiver,
    wherein the second smoke detector wireless transceiver is configured to be in two-way audio communication with the doorbell wireless transceiver such that i) the doorbell wireless transceiver transmits audio from the doorbell microphone to the second smoke detector wireless transceiver and receives audio from the second smoke detector microphone via the second smoke detector wireless transceiver, and ii) the second smoke detector wireless transceiver transmits audio from the second smoke detector microphone to the doorbell wireless transceiver and receives audio from the doorbell microphone via the doorbell wireless transceiver.

5. The system of claim 4, wherein the first smoke detector is configured to be in the two-way audio communication with the doorbell wireless transceiver independent of the second smoke detector being in the two-way audio communication with the doorbell wireless transceiver.

6. The system of claim 5, wherein the two-way audio communication between the first smoke detector wireless transceiver and the doorbell wireless transceiver is established as a result of the first smoke detector microphone receiving a first voice command, and wherein the two-way audio communication between the second smoke detector wireless transceiver and the doorbell wireless transceiver is established as a result of the second smoke detector microphone receiving a second voice command.

7. The system of claim 5, further comprising:
    a control panel at the interior of the premises, the control panel comprising:
        a control panel wireless transceiver configured to be in communication with at least one of the first smoke detector wireless transceiver, the second smoke detector wireless transceiver, and the doorbell wireless transceiver, and
    a processor configured to receive input and, in response to the input, cause the control panel to prevent at least one of i) audio output at at least one of the first smoke detector speaker and the second smoke detector speaker, and ii) audio input at at least one of the first smoke detector microphone and the second smoke detector microphone.

8. The system of claim 7, wherein the control panel further comprises a user interface, and wherein the input received by the processor is a reject link command input received at the user interface.

9. The system of claim 7, wherein the input received by the processor is a reject link command input received according to a preset time-based instruction.

10. The system of claim 1, wherein the smoke detector further comprises at least one of a PIR sensor and an imaging device configured to detect movement of an occupant, and wherein the smoke detector wireless transceiver is configured to be in two-way audio communication with the doorbell wireless transceiver when the at least one of the PIR sensor and the imaging device detect movement of the occupant.

11. A method comprising:
establishing a two-way audio communication session between a doorbell at an exterior of a premises and a smoke detector at an interior of the premises, the doorbell comprising: a doorbell housing, a button at the doorbell housing configured to be actuated by a visitor to the premises, a doorbell wireless transceiver at the doorbell housing, a doorbell speaker at the doorbell housing and coupled to the doorbell wireless transceiver, and a doorbell microphone at the doorbell housing and coupled to the doorbell wireless transceiver, the smoke detector comprising: a smoke detector housing, a smoke detector wireless transceiver at the smoke detector housing, a smoke detector speaker at the smoke detector housing and coupled to the smoke detector wireless transceiver, and a smoke detector microphone at the smoke detector housing and coupled to the smoke detector wireless transceiver, wherein establishing the two-way audio communication session is initiated upon the visitor actuating the button, wherein upon the visitor actuating the button, the doorbell wireless transceiver transmits a link request signal to the smoke detector wireless transceiver;
receiving first audio at the doorbell microphone and transmitting, via the doorbell wireless transceiver, the first audio to the smoke detector wireless transceiver;
outputting, via the smoke detector speaker, the first audio;
receiving second audio at the smoke detector microphone and transmitting, via the smoke detector wireless transceiver, the second audio to the doorbell wireless transceiver; and
outputting, via the doorbell speaker, the second audio.

12. The method of claim 11, wherein upon the smoke detector wireless transceiver receiving the link request signal, the smoke detector wireless transceiver transmits a link confirmation signal to the doorbell wireless transceiver.

13. The method of claim 12, wherein the two-way audio communication session between the smoke detector wireless transceiver and the doorbell wireless transceiver is established as a result of the doorbell wireless transceiver receiving the link confirmation signal.

14. The method of claim 11, wherein the smoke detector comprises a first smoke detector, and the method further comprises: establishing a second two-way audio communication session between the doorbell and a second smoke detector at the interior of the premises, the second smoke detector comprising: a second smoke detector housing, a second smoke detector wireless transceiver at the second smoke detector housing, a second smoke detector speaker at the second smoke detector housing and coupled to the second smoke detector wireless transceiver, and a second smoke detector microphone at the second smoke detector housing and coupled to the second smoke detector wireless transceiver;
transmitting, via the doorbell wireless transceiver, the first audio to the second smoke detector wireless transceiver;
outputting, via the second smoke detector speaker, the first audio;
receiving third audio at the second smoke detector microphone and transmitting, via the second smoke detector wireless transceiver, the third audio to the doorbell wireless transceiver; and
outputting, via the doorbell speaker, the third audio.

15. The method of claim 14, wherein the two-way audio communication session between the first smoke detector wireless transceiver and the doorbell wireless transceiver is established as a result of the first smoke detector microphone receiving a first voice command, and wherein the second two-way audio communication session between the second smoke detector wireless transceiver and the doorbell wireless transceiver is established as a result of the second smoke detector microphone receiving a second voice command.

16. The method of claim 14, further comprising:
receiving input at a control panel at the interior of the premises, the control panel comprising a control panel wireless transceiver configured to be in communication with at least one of the first smoke detector wireless transceiver, the second smoke detector wireless transceiver, and the doorbell wireless transceiver; and
in response to the input at the control panel, preventing at least one of i) the first audio output at at least one of the first smoke detector speaker and the second smoke detector speaker, ii) the second audio reception at the first smoke detector microphone, and iii) the third audio reception at the second smoke detector microphone.

* * * * *